(No Model.)

G. D. MUNSING.
DRIVING WHEEL FOR MACHINERY.

No. 428,728. Patented May 27, 1890.

Witnesses:
J. Jessen
A. M. Gaskill

Inventor:
George D. Munsing
By Paul &c.
Att'ys

UNITED STATES PATENT OFFICE.

GEORGE D. MUNSING, OF MINNEAPOLIS, MINNESOTA.

DRIVING-WHEEL FOR MACHINERY.

SPECIFICATION forming part of Letters Patent No. 428,728, dated May 27, 1890.

Application filed October 29, 1889. Serial No. 328,572. (No model.)

*To all whom it may concern:*

Be it known that I, GEORGE D. MUNSING, of Minneapolis, in the county of Hennepin and State of Minnesota, have invented certain new and useful Improvements in Driving-Wheels for Machinery, of which the following is a specification.

The object of this invention is to provide a driving-wheel for use generally in connection with all sorts of machinery whereby a certain amount of power and no more may be applied to the machine.

The invention consists, generally, in constructing a driving-wheel with a rim or face that is secured to the body of the wheel by the friction between said rim and adjustable bearings arranged upon the body of the wheel.

Figure 1:
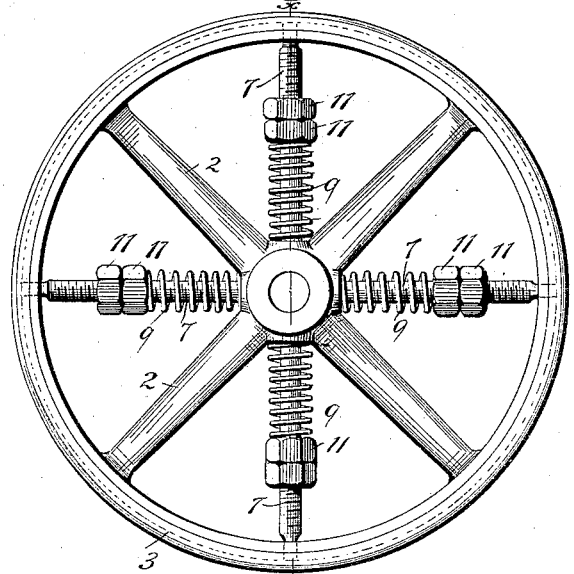
Figure 2:
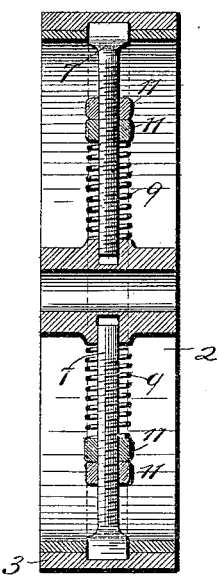
Figure 3:
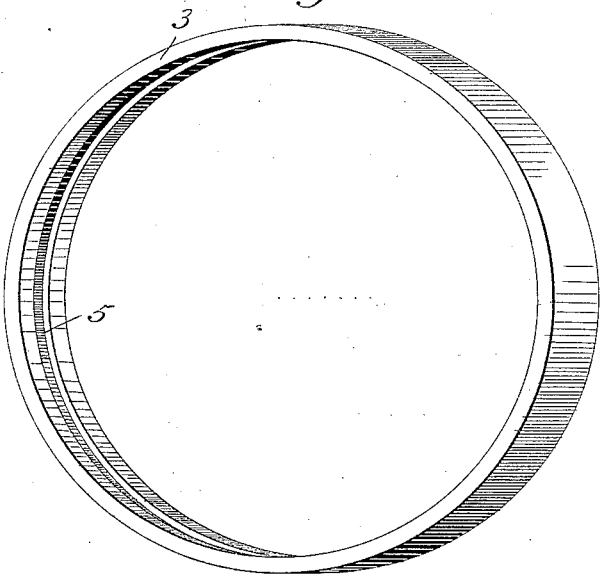
Figure 4:
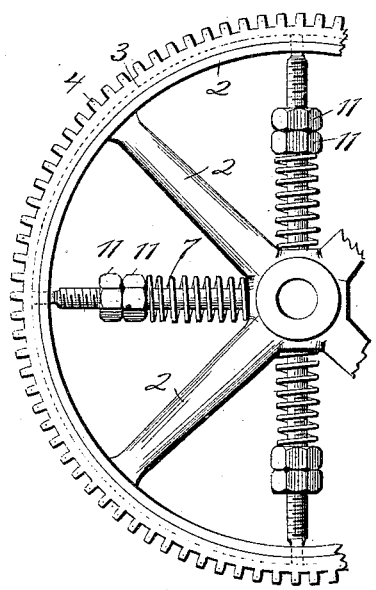

In the accompanying drawings, forming part of this specification, Figure 1 is a side elevation of a pulley embodying my invention. Fig. 2 is a vertical section of the same on line $x\ x$ of Fig. 1. Fig. 3 is a perspective view of the rim of the pulley. Fig. 4 is a partial side elevation similar to Fig. 1, but showing the rim provided with teeth, and thereby forming the wheel into a spur-gear.

In the drawings, 2 represents the body of the wheel, which consists, preferably, of a suitable hub, a rim, and spokes extending from the hub to the rim. A supplementary rim 3 is arranged outside of the rim of the wheel, fitting loosely thereon. This rim is preferably provided with a groove 5, extending around its inner circumference. A series of rods 7 have their inner ends arranged in sockets in the hub of the wheel, and are adapted to slide freely therein. The outer ends of these rods project through openings in the rim of the wheel and extend into the groove 5 in the rim 3. Springs 9 surround the rods 7, their inner ends resting, preferably, upon the hub of the wheel. The rods 7 are screw-threaded for at least a part of their length, and nuts 11 are arranged upon said rod, engaging the outer end of the springs 9. The ends of the rods 7 form adjustable bearings by which the rim 3 is held, and the amount of friction between the inner surface of said rim and said bearings determines the amount of power that may be transmitted through said wheel before said rim 3 will slip upon its bearings. This friction may be regulated by increasing or decreasing the tension of the springs 7 through the nuts 11. In using this pulley upon machines I first ascertain the amount of power that is required to run the machine and I then regulate the tension of the spring 7, so that if any more power than is necessary to run the machine is applied to said wheel the rim 3 will slip thereon and the additional power will not be transmitted to the machine.

The wheel shown in Fig. 4 is similar to that shown in the other figures, except that I have here shown the rim 3 provided with a series of teeth 4, thereby forming the wheel into a spur-gear.

In using machines having this driving-wheel, if from any cause the machine becomes clogged, the rim of the pulley will slip, thereby preventing damage to the machine and belts.

The invention is especially useful in connection with knitting-machines and other light or delicate machines, which are often damaged by becoming clogged when driven in the usual way. With this device it is impossible to injure the machines by getting them clogged up.

I claim as my invention—

1. The combination, with a driving-wheel provided with a fixed rim, of a supplemental rim arranged outside of said fixed rim and free to turn thereon, and a series of adjustable spring-bearings upon said wheel engaging the inner surface of said supplemental rim.

2. The combination, with a driving-wheel provided with a fixed rim, of a supplemental rim arranged on the fixed rim and free to turn thereon, rods arranged in sockets in the hub of the wheel and engaging the supplemental rim, and springs on said rods holding them in engagement with said supplemental rim, substantially as described.

3. The combination, with the driving-wheel 2, of the rim 3, fitting loosely thereon and provided with a groove 5 upon its inner surface, the rods 7, arranged in sockets in the hub of the wheel and engaging the groove in said rim 3, the springs 9 on said rods, and the adjusting-nuts 11, all substantially as described.

In testimony whereof I have hereunto set my hand this 12th day of October, 1889.

GEORGE D. MUNSING.

In presence of—
A. C. PAUL,
A. M. GASKILL.